May 4, 1943. T. BROWN 2,318,194
AUTOMATIC DEPTH CONTROLLING MECHANISM
Filed Oct. 20, 1939 3 Sheets-Sheet 3

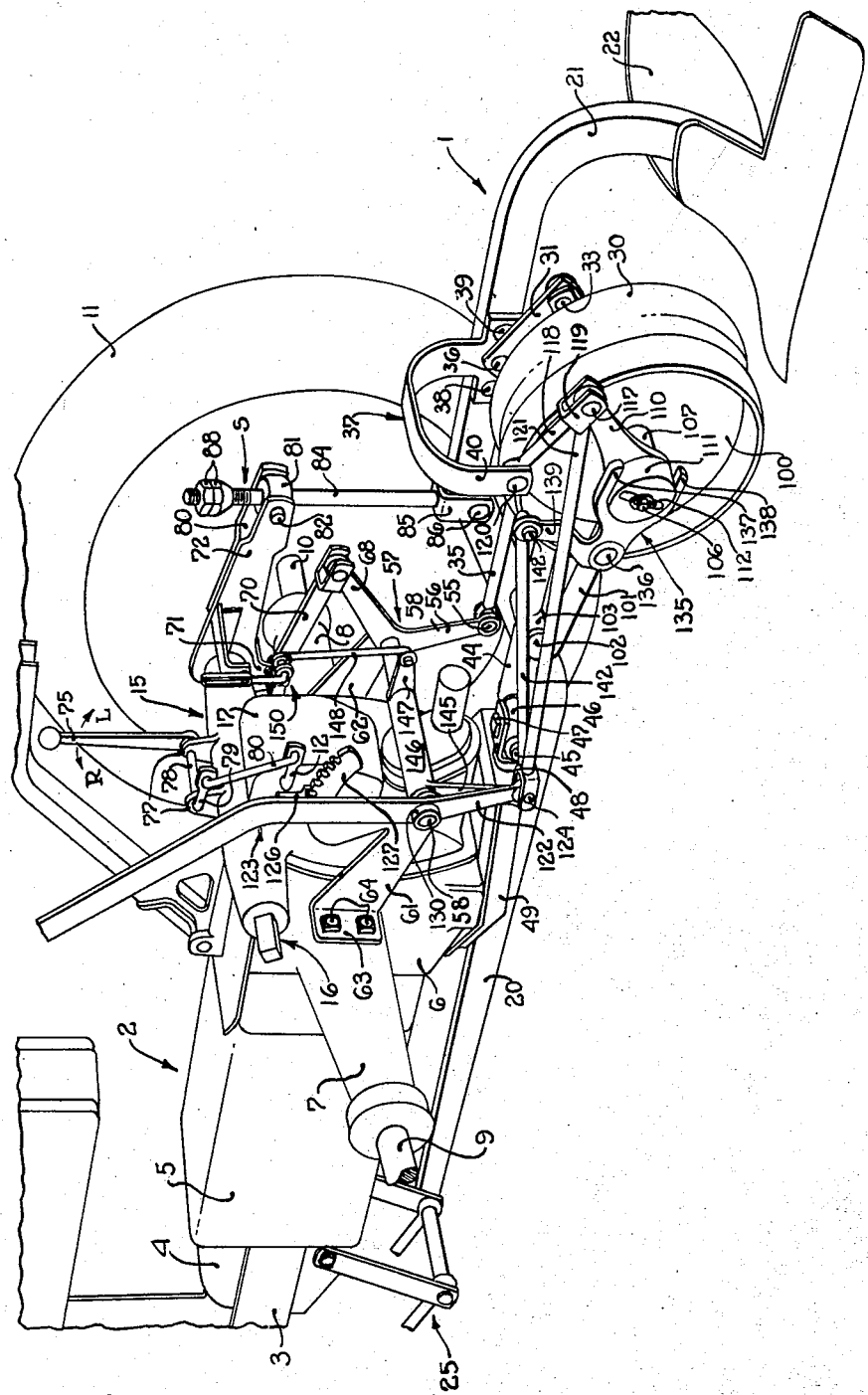

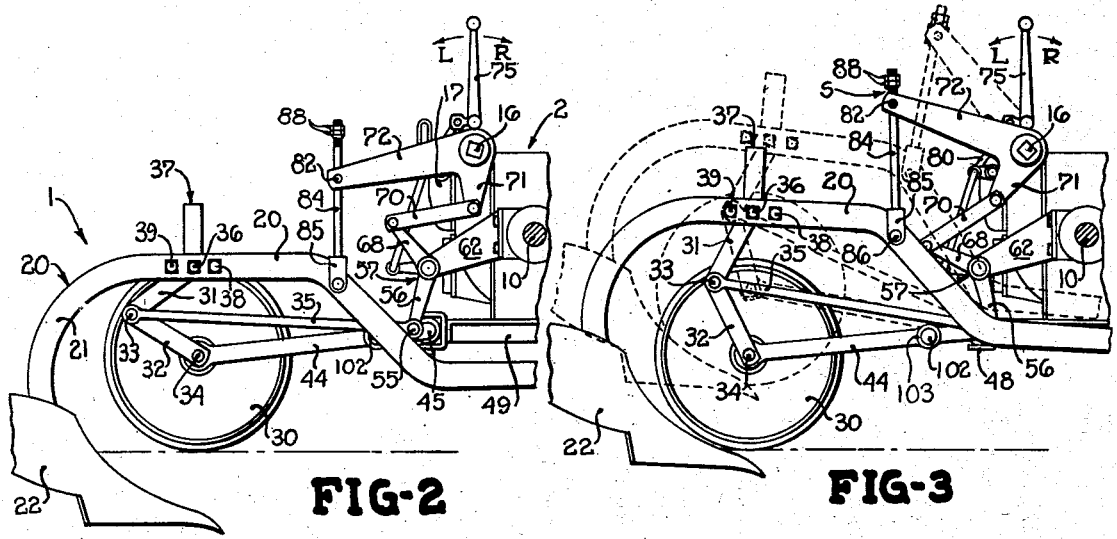
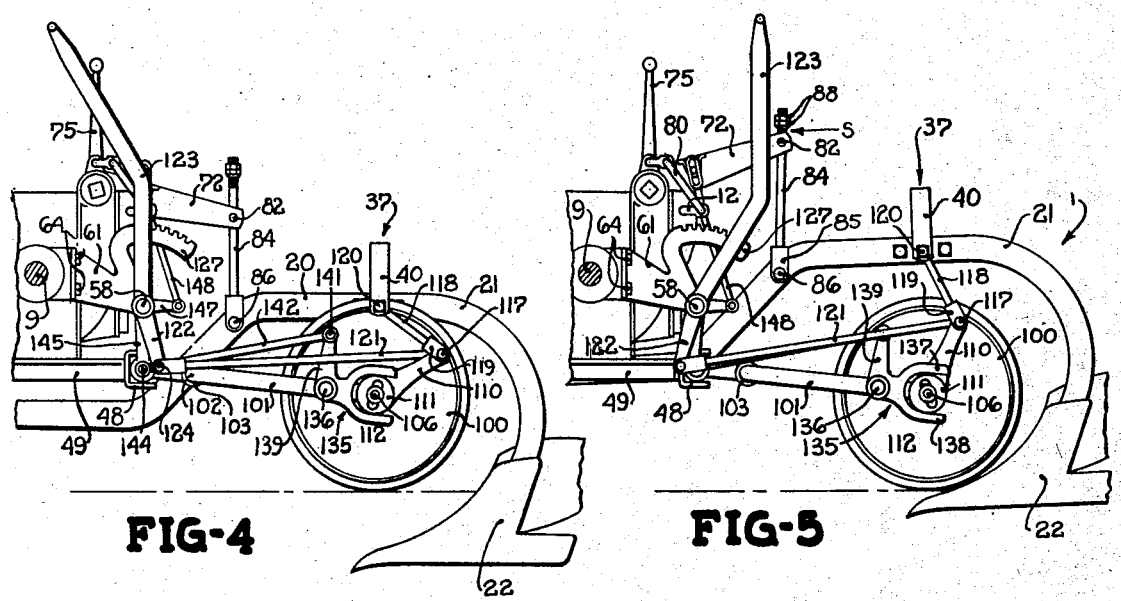

INVENTOR:
Theophilus Brown
BY
ATTORNEYS.

Patented May 4, 1943

2,318,194

UNITED STATES PATENT OFFICE 2,318,194

AUTOMATIC DEPTH CONTROLLING MECHANISM

Theophilus Brown, Moline, Ill., assignor to Deere & Company, Moline, Ill., a corporation of Illinois Application October 20, 1939, Serial No. 300,371

39 Claims. (Cl. 97—47)

The present invention relates generally to agricultural implements and more particularly to implements having one or more ground working tools, the operating position of which may be varied and, further, in which the tool is adapted to be raised entirely out of engagement with the ground for transport or other purposes.

The object and general nature of the present invention lies in the provision of automatically operating means for gauging the operating depth of the ground working tool from the ground surface so that through suitable operating means, preferably deriving power from the tractor or other propelling means, the ground working tool is constantly maintained at a given depth of penetration, which may be adjusted, independently of the relative positions which the ground working tool may take with respect to the tractor or other propelling means. More specifically, it is a feature of the present invention to provide means riding along the ground surface traversed by the implement and operating to control other means that raises and lowers the tool, as required. Further, it is a feature of this invention to provide a pair of independently movable ground engaging elements associated with the ground working tool, one of the elements forming a part of the mechanism for raising and lowering the tool while the other element serves to control the operation of the raising and lowering means to automatically maintain the tool at the desired depth. In this connection it is a still further feature of the present invention to arrange the parts so that said one element takes the reaction of the raising and lowering means but the other element is subjected to practically no load other than its own weight, thereby providing an extremely accurate and sensitive control.

Another feature of the present invention is the provision of raising and lowering means for the ground engaging tool, the raising and lowering means being of a hydraulic self-locking arrangement under the control of means that respond to the position of the tool relative to the ground surface. It is also a feature of this invention to provide means whereby the hydraulic mechanism is also adapted to raise the tool into its transport position and at the same time disengaging the operative connection between the automatic gauging means and the hydraulic mechanism.

These and other objects and advantages of the present invention will be apparent to those skilled in the art after a consideration of the following detailed description of the preferred structural embodiment which is illustrated in the accompanying drawings.

In the drawings:

Figure 1 is a perspective view of the rear end of a tractor and associated implement, in which the principles of the present invention have been incorporated;

Figure 2 is a side view of the rear portion of the machine, showing the plow bottom in deep plowing position;

Figure 3 is a view similar to Figure 2, showing the plow bottom in shallow plowing position;

Figure 4 is a view similar to Figure 2, but showing the opposite side of the machine and illustrating the gauging connections by which the depth of plowing is controlled automatically from the ground surface;

Figure 5 is a view similar to Figure 4, showing the parts adjusted for shallow plowing;

Figures 6, 8:
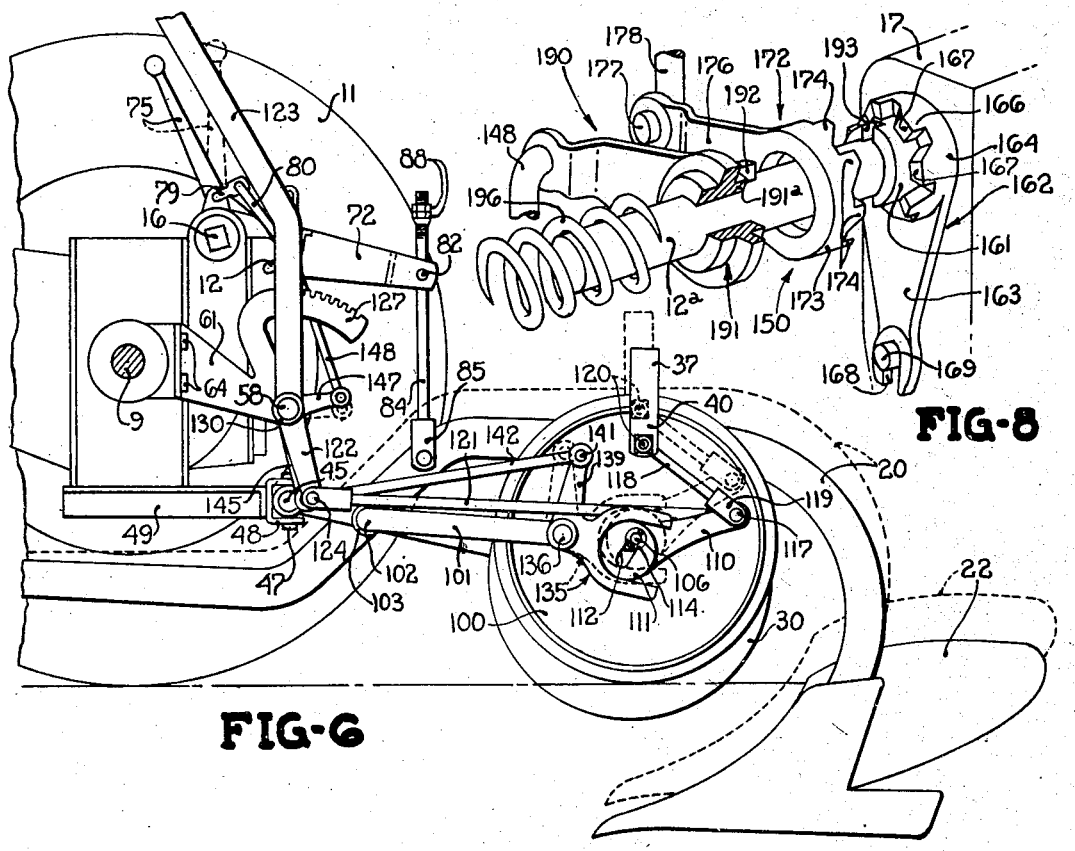
Figure 6 is a view similar to Figures 4 and 5 but at a larger scale, showing the operation of the automatic depth controlling means.
Figure 8 is a separated view of the parts shown in Figure 7.

Referring now more particularly to Figures 1 to 3, the reference numeral 1 indicates, in its entirety, a plowing implement and the reference numeral 2 indicates the tractor to which the implement 1 is connected to be propelled thereby. The tractor 2 is of more or less conventional construction, embodying a frame 3, a motor 4, the crank case and transmission housing 5 of which serves as a part of the frame, and a rear axle housing 6 having tubular sleeve extensions 7 and 8 in which two axle shafts 9 and 10 are journaled. The tractor 2 is provided with front wheels (not shown) and rear driving wheels 11, the left rear wheel being removed from the axle shaft 9 in Figure 1, in order to show more clearly the gauging and depth adjusting parts of the machine with which the present invention is more particularly concerned.

The tractor 2 is provided with power lift mechanism, indicated in its entirety by the reference numeral 15, which is preferably hydraulically actuated and includes a transverse rock shaft 16 actuated by suitable hydraulic mechanism under the control of valve means having a valve actuating arm 12. Preferably, the hydraulic mechanism includes a pump driven from the tractor motor 4, a double acting cylinder and piston arrangement for rocking the shaft 16 from one position to the other under the control of the valve means at 12, the valve mechanism being disposed in a section 17 which forms a part of the rear axle housing 6 when the tractor 2 is provided with hydraulic power lift means as shown. The power lift mechanism 15 may take the general form of the power lift mechanism disclosed in my prior United States Patent No. 2,197,848, issued April 23, 1940, and this is the general form of hydraulic lift mechanism shown by way of illustration in the accompanying drawings, with the exception that the feature of automatically actuating the valve into either of its fully raised or fully lowered positions has been omitted and the valve means 12 arranged so that it may be moved in a position to lock the piston, and hence the power lift shaft 16, in any position in its cylinder against movement in at least one direction, along the lines of the hydraulic power lift shown in the patent to Harold Brown, No. 1,929,804, issued October 10, 1933. Obviously, of course, any other suitable form of power lift mechanism, either double- or single-acting, may be employed in the present invention, so long as such mechanism is of the type which may be raised or lowered, as desired, or held in any intermediate position, in any suitable manner, as by moving a valve lever, such as 12, from a neutral or locked position into either of two operative positions.

In order to best illustrate the principles of the present invention, the implement 1 is in the form of an integral plow including a generally longitudinally extending plow beam 20 curved, as at 21, at its rear end and carrying a furrow opener 22. Obviously, of course, other forms of ground working tools may be employed, if desired. The front end of the plow beam 20 is pivotally connected with the tractor by suitable hitch means 25 so that the plow beam 20, and the furrow opener 22 carried thereby, may swing generally vertically relative to the tractor, and also laterally to some extent, whereby the plow bottom 22 may move along in operating position more or less independently of variations in the position of the tractor relative thereto, as may occur, for example, when traversing rough or uneven ground.

A first gauge wheel 30 is movably connected with the tool beam 20 by a pair of links 31 and 32, the links being pivotally connected to one another by a pivot pin 33 which also pivotally receives the rear end of a generally longitudinally extending operating link 35. The upper end of the upper link 31 is pivoted, as at 36 (Figures 1 to 3), by means of a pivot bolt 36 or the like which is carried by the plow beam 20 and passes through an inverted U-shaped bracket 37 which is fastened, as at 38 and 39 (Figure 1), to the plow beam 20, extending over the gauge wheel 30 and terminating in an end 40 extending downwardly on the left side thereof. The gauge wheel 30 is journaled for rotation on the rear end of an arm 44 which serves as a crank axle, having a forward end 45 bent laterally (Figure 1) and received for rocking movement in a general vertical direction about a transverse axis in a block 46 which is pivoted by trunnions 47 for pivotal movement about a vertical axis in a yoke 48 which is fastened to a supporting structure 49 bolted to the underneath side of the rear axle housing 6. Since the crank axle 44 has both horizontal swinging movement and vertical swinging movement relative to the tractor carried support 49, it will be seen that the gauge wheel 30 is permitted to move with the plow beam 20 of the implement 1, forming a part thereof. The forward connection of the plow beam 20 with the hitch 25 is arranged to provide for a limited amount of lateral swinging movement.

The furrow opener 22 is arranged to have its operating depth determined by the position of the gauge wheel 30 relative to the plow beam 20 and the furrow opener 22 secured to the rear end thereof. To this end, the forward end of the link 35 is loosely pivoted, as at 55, to one arm 56 of a bell crank 57 which preferably is welded or otherwise fixed to a transverse bar 58, the ends of which are supported for rocking movement in a pair of brackets 61 and 62 fixed to the tractor in any suitable manner, as by having laterally outwardly turned ends 63 apertured to receive attaching stud bolts 64. The other arm 68 of the bell crank 57 pivotally receives the rear end of a link 70, the forward end of which is pivoted to an arm 71 which forms a part of a power lift arm 72. The power lift arm 72 is securely fixed to the squared right hand end of the power lift rock shaft 16. The power lift unit 15 of the tractor 2 is under the control of a hand lever 75 mounted on the upper portion of the housing enclosing the power lift mechanism by any suitable means, such as a pair of lugs 77 rockably receiving a shaft 78, to one end of which the hand lever 75 is fixed and the other end of which carries an arm 79 which is connected by a link 80 to the valve actuating arm 12, as shown in Figure 1. In this figure the hand lever 75 and the valve arm 12 are shown in their neutral positions, in which the power lift rock shaft 16 is locked against movement in at least one direction.

The operation of the structure so far described is substantially as follows:

When it is desired to raise the plow bottom 22 from a deep plowing position (Figures 1 and 2) to a shallow plowing position (Figure 3), the operator moves the hand lever 75 forwardly, which actuates the valve means 12 and causes the rock shaft 16 to be rocked in a clockwise direction as viewed in Figures 2 and 3. Generally, the power lift rock shaft 16 is adapted to be moved through a total angular displacement of about 60 degrees, and of this range of movement, the first part is utilized for securing different depths of operation, the limits of which are shown in Figures 2 and 3. When the power lift rock shaft 16 is rocked to raise the plow out of its deep plowing position (Figure 2), the rearward movement of the gauging arm 71 acts through the link 70 and bell crank 57 to exert a forward pull on the link 35, since the clockwise rotation of the arm 71 causes the counterclockwise rotation of the bell crank 57. This swings the upper link 31, the upper end of which is pivoted as at 36 to the plow beam 20, and exerts a thrust through the lower link 32 against the crank axle 44 and the gauge wheel 30, the lower end of the link 32 being pivoted to the crank axle by a pivot pin or bolt 34. It will be understood, of course, that at any intermediate position of the furrow opener 22, between that shown in Figure 2 and that shown in Figure 3, the valve controlling lever 75 may be returned to its neutral position, thus locking the power lift rock shaft 16, together with the gauging connections associated therewith, in that particular position. From Figures 2 and 3, it will be noted that the pivot 55 connecting the forward end of the longitudinally extending link 35 and the lower end or arm 56 of the bell crank 57 is disposed closely adjacent the transverse axis defined by the forward end 45 of the crank axle 44, both of the axes 45 and 55 being disposed adjacent the plow beam 20, whereby rising and falling movement of the plow beam 20 and furrow opener 22 as the tractor passes over uneven ground will have no material effect upon the position of the links 31 and 32, and hence the position of the gauge wheel 30 relative to the plow beam 20, even though the front end of the link 35 and the front end of the crank axle 44 are pivoted to the tractor. Thus, the position in which the power lift rock shaft 16 and associated parts hold the bell crank 57 determine the operating depth of the furrow opener 22, at least so long as the gauge wheel 30 rides along the top surface of the ground, as indicated in Figures 2 and 3.

Mention was made above of the fact that the initial range of movement of the rock shaft 16 is utilized for adjusting the furrow opener 22 for different depths of operation, as indicated in Figures 2 and 3. The next subsequent range of movement of the rock shaft 16 is utilized for lifting both the plow beam 20 and furrow opener 22, as well as the gauge wheel 30 itself, out of ground engaging position and into a transport position. To this end, the power lift arm 72 is provided with a bifurcated end 80 between the two parts of which a swivel block 81 is pivotally mounted on trunnions 82. The block 81 slidably receives a rod 84, the lower end of which is formed with a yoke 85 that embraces and is pivotally connected, as at 86, to the plow beam 20. The upper end of the rod 84 is threaded and receives a pair of adjusting nuts 88. The position of the arm 72 and the length of the rod 84 are such that when the plow bottom 22 is in its most shallow plowing position, there is sufficient space S to permit the implement 1 to rise and fall relative to the tractor. However, when the hand lever 75 is shifted forwardly to cause the power lift rock shaft 16 to be rocked in a clockwise direction, after the shallow plowing position (Figure 3) has been passed, the swivel block 81 engages the lowermost nut 88, whereupon the continued clockwise movement of the lifting arm 72 exerts a direct pull through the rod 84 against the plow beam 20, raising the entire assembly, including the gauge wheel 30, into its transport position, as indicated by dotted lines in Figure 3. From the latter figure, it will be seen that the arm 71 and the link 70 move into substantially a straight line relation as the plow bottom 22 is adjusted for shallow plowing. This construction results in the advantage that further rocking movement of the power lift rock shaft 16 causes very little additional movement of the bell crank 57 beyond that shown in Figure 3, and from this figure it will also be seen that for shallow plowing position the links or arms 31 and 32 also approach their straight line position, so that whatever little movement that does occur when the implement 1 is raised into its transport position, has substantially no effect upon moving the gauge wheel 30 downwardly much beyond the point of the plow bottom 22.

The above described structure by which the first range of movement of the power lift mechanism serves to adjust the operating depth of penetration of the plow bottom 22 and the subsequent range of movement serves to lift both the plow bottom and the gauge wheel itself out of ground engaging position is substantially the same as the corresponding mechanism disclosed in my prior United States patent, Re. 22,019, dated February 10, 1942.

According to the principles of the present invention, means is provided for automatically maintaining the plow bottom 22 at a constant plowing depth, even though the pressure of the plow bottom may be such that the gauge wheel 30 no longer rides on the surface of the ground but sinks into it some distance, the amount of which depends upon the soil pressure, the speed of operation, and the softness of the ground. Also, means is provided for manually adjusting the depth at which the plow bottom 22 is constantly maintained, all without interference with the raising of the implement into its transport position.

Referring now more particularly to Figures 1, 4 and 5, the reference numeral 100 indicates a second gauge wheel or pilot disposed alongside the first gauge wheel 30 and mounted for rotation on an auxiliary crank axle 101 connected at its forward end with the tractor 2 for vertical swinging movement about a transverse axis. Preferably, the crank axle 101 is provided with a laterally bent end 102 which is received in a sleeve section 103 formed on or carried by the first gauge wheel crank axle 44. As best shown in Figures 2 to 5, the sleeve section 103 is disposed quite close to the axis defined by the section 45 of the crank axle 44, whereby vertical swinging movement of the crank axle 101 relative to the other crank axle 44 does not, within limits, occasion material longitudinal movement of the gauge wheel 100 relative to the first mentioned gauge wheel 30. Normally, both crank axles 44 and 101 swing together as the plow rises and falls relative to the tractor. The rear end of the crank axle 101 carries a pin 106, which is in line with the laterally directed section 107 on which the wheel 100 is journaled (Figure 1). A link 110 having a drum section 111 has a slot 112 formed in the latter to receive the pin 106 which extends outwardly through the slot 112. The lower end of the link 110 is held in position for pivoting and sliding movement on the pin 106 by a washer 114 and cotter key, or by any other suitable means desired. The upper end of the link 110 receives a pivot pin 117 by which the link 110 is pivotally connected to an upper link 118 which has a yoke 119 receiving the pin 117 and is pivoted, as at 120, to the end 40 of the bracket 37 that is fixed to the plow beam 20. The pivot 117 also receives the rear end of a link 121 which extends generally longitudinally and forwardly to the lower end 122 of a hand lever 123, being connected to the lower end 122 by a pivot 124. The hand lever 123 is mounted for rocking movement on the left end of the rock shaft 58 to which the bell crank 51 is fixed, and the hand lever 123 carries the usual detent mechanism 126 by which the lever 123 may be latched to a sector 127 which is fixed to or formed as a part of the left bracket 61 that supports the rock shaft 58. A collar 130 or other suitable means serves to hold the lever 123 on the rock shaft 58.

A bell crank 135 is pivotally mounted, as at 136, on the rear end of the crank axle 101. One end of the bell crank 135 is bifurcated so as to form vertically separated sections 137 and 138 which are disposed on opposite sides of and receive the drum section 111 of the link 110. The other arm 139 of the bell crank 135 is pivoted, as at 141, to the rear end of a forwardly extending link 142 that is pivoted, as at 144, to the lower end of an arm 145, the upper end of which is fixed as by welding or the like, to a sleeve 146 disposed for rocking movement on the rockable shaft or bar 58, as best shown in Figure 1. The arm 145 is fixed to the left end of the sleeve 146, and to the right end of the latter a second arm 147 is fixed, as by welding or the like. The arm 147 is connected by a link 148 to actuate valve mechanism indicated in its entirety in Figure 1 by the reference numeral 150. This valve mechanism, as will be explained below in detail and is shown more clearly in Figures 7 and 8, serves to place the valve means 12 under the control of the gauge wheel 100 and its position relative to the pivot 120 on the plow beam bracket 37. As clearly shown in Figures 1 and 2, in normal operating position, either deep plowing (Figure 4) or shallow plowing (Figure 5), the two gauge wheels 30 and 100 operate alongside one another, with the pin 106 disposed in the central portion of the slot 112 in the drum section 111 of the link 110. This disposition of the drum section 111 relative to the pin 106 serves to hold the bell crank 135 in its intermediate position, and as will be explained below, this serves to hold the valve means 12 in its intermediate position which, in turn, acts to hold the power lift shaft 16, and through it and the bell crank 57, the longitudinally extending link 35 and the toggle links or arms 31 and 32 are held in their adjusted position, whereby the gauge wheel 30 (Figures 2 and 3) is held in its proper position. Thus, unless the hand lever 75 is operated, so long as the two gauge wheels 30 and 100 operate at the same level, all of the depth adjusting and varying connections are, so to speak, held in status quo. This does not, however, interfere with the ability of the implement 1 to rise and fall as a unit relative to the tractor, for it will be observed, particularly from Figures 4 and 5, that the pivots 102, 124 and 144 are all disposed in or closely adjacent to the pivot axis defined by the front end 45 of the crank axle 44. Hence, rising and falling movement of the implement 1 relative to the tractor can occasion no material longitudinal movement of the links 35, 121, and 142, and therefore all of the valve operating parts remain in their neutral or intermediate position. If it should occur, however, that the plow should strike soft ground so that the weight of the plow and associated parts would bear sufficiently heavy on the gauge wheel 30 and cause the same to sink into the ground, this would, as is obvious, permit the plow bottom 22 to operate deeper than the desired depth. There is no appreciable load on the gauge wheel 100, notwithstanding the fact that the gauge wheel 30 carries the weight of the implement, and hence when the wheel 30 sinks into the ground under the conditions assumed, the other gauge wheel 100 remains on the surface. However, if the gauge wheel 30 sinks into the ground, permitting the plow bottom 22 and the beam 20 to lower, the point 120 (Figure 4) also lowers. The forward end of the link 121 is pivoted at the point 124 to the lower end 122 of the lever 123, and since the latter is fixed by the detent mechanism 126, the link 121 is held against longitudinal movement. Therefore, when the point 120 lowers, the link 110 is forced in a generally downward direction relative to the gauge wheel 100 which remains on the surface. The downward movement of the pivot 120 causes the drum section 111, received between the two parts 137 and 138, to swing the bell crank lever 135 in a clockwise direction (Figure 4) about its pivot 136. This exerts a rearward pull on the link 142 which, in turn, causes the arms 145 and 147, which in reality constitute a bell crank, to swing in a counterclockwise direction (Figure 4), exerting an upward thrust through the link 148 which, as will be explained below in connection with the detailed description of the valve mechanism 150, rocks the valve mechanism in a direction to cause the rock shaft 16 to be shifted in a direction to raise the plow bottom 22, this being accomplished by a movement of the power lift rock shaft 16 and interconnected arms 71 and 72, in a clockwise direction as viewed in Figure 2 and in a counterclockwise direction as viewed in Figure 4. When this action of the raising and lowering mechanism brings the point 120 up to its former distance from the ground surface, the lower drum section 111 of the link 110 is moved so that the bell crank 135 is restored to its neutral position, whereupon further raising action ceases. In this position, therefore, the implement is operated with the plow bottom 22 at the desired depth, but with the gauge wheel 30 pressing into the ground an amount sufficient to carry the load. Now if the ground should become harder the gauge wheel 30 then will ride on the surface, as it normally does. Momentarily, therefore, the point 120 now is raised above its former point, shifting the drum section 111 in the other direction relative to the pin 106 and rocking the bell crank lever 135 in a counterclockwise direction (Figure 4), which acts through the valve controlling means 150 to cause the power lift rock shaft 16 to rock in a downward direction lowering the plow relative to the gauge wheel 30 until normal positions (Figure 1) are resumed, with the two gauge wheels 30 and 100 alongside one another. Figure 6 illustrates in full and dotted lines the action just described.

Thus, the auxiliary gauge wheel 100 and associated connections operate to maintain the plow bottom 22 at substantially constant depth, regardless of the ground surface, whether soft or hard. In reality, the gauge wheel 100 and associated parts serve as means responsive to the distance between the point 120, and hence also the plow beam 20 and the furrow opener 22, and the ground surface and controls the hydraulic power lift connections so as to maintain this distance constant at all times.

In order to adjust the implement for plowing at different depths, the lever 123 is moved to different positions. Figure 4 shows the deep plowing position and Figure 5 shows a shallow plowing position. Moving the lever 123 from one position to another, not only automatically adjusts the plow for plowing at that new depth but, at the same time, acts to raise or lower the plow so as to bring it from its old position into the desired position. This is accomplished by the linkages and valve mechanism just described. For example, assume that the plow bottom 22 has been operating in deep plowing position, as shown in Figures 2 and 4, and it is desired to have the plow run more shallow. The operator will disengage the latch mechanism 126 (Figure 1) and move the lever 123 rearwardly one or more notches. Assuming that the plow is already in operation, it will be seen from Figure 4, that as soon as the lever 123 is moved rearwardly, the link 121 is shifted forwardly and exerts a thrust against the pivot 120 forcing the drum section 111 downwardly relative to the pin 106. This immediately rocks the bell crank 135 in a clockwise direction (Figure 4) which raises the plow as described above. If the lever 123 is moved rearwardly ahead of the action of the rock shaft 16 and associated parts operative to raise the plow, the latter will be continually raised until it occupies its highest or most shallow plowing position, as shown in Figures 3 and 5. The operation of increasing the plowing depth is the reverse, as will be readily understood. It is an important feature of this invention, not only to secure automatically a constant depth of operation but, in addition, to be able to adjust that depth of operation without stopping the outfit and without being called upon to exert any great amount of force. The only force required to be overcome is the resistance offered by the valve controlling mechanism 150, and similarly this is the only force which the gauge wheel 100 is required to sustain, and from this fact it will be understood that the gauge wheel 100 remains on the surface of the ground, no matter how soft it may at times be.

I have described above the construction and manner of operation of the mechanism that responds to the position of the plow relative to the ground for automatically maintaining the plow at a constant depth of penetration, acting through the hydraulic raising and lowering mechanism which, through another range of movement, is also arranged for raising the plow into its transport position. It is desirable, therefore, to provide means whereby the automatic depth control is itself automatically disengaged when the hydraulic power lift mechanism has operated to raise the plow beyond its operating position and begins raising the same into its transport position. The automatic valve controlling mechanism and the means by which the same is disengaged at the end of the depth gauging movement, will now be described.

Figure 7:
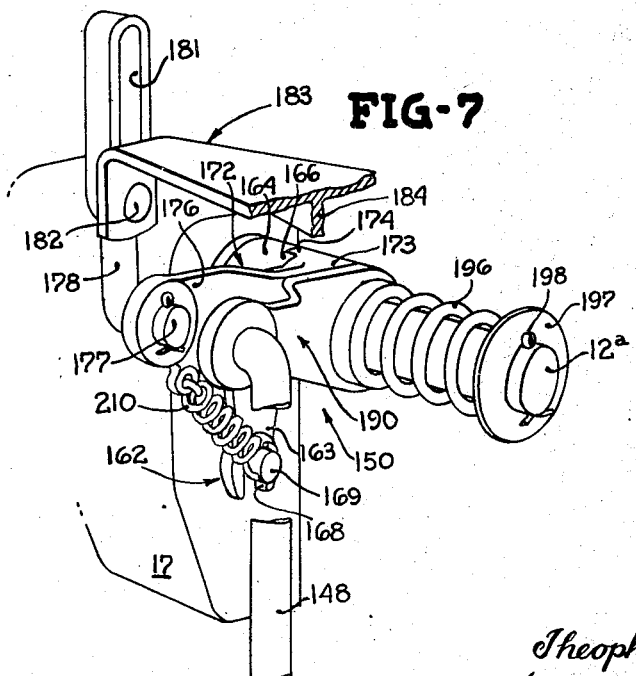
Figure 7 is a perspective view of a portion of the hydraulic valve controlling mechanism.

The automatic valve controlling and disengaging mechanism 150 is, as best shown in Figures 7 and 8, disposed at the right side of the valve housing 17. As mentioned above, the arm 12 (Figure 1) forms a part of or is fixed to a valve actuating shaft, shown at 12a in Figures 7 and 8. The valve means controlled by the shaft 12a may be of any suitable construction providing for actuating the hydraulic mechanism of the power lift in either direction, as desired, or holding it against movement in at least one direction in any intermediate position. The details of such hydraulic mechanism do not per se form a part of the present invention, and hence has not been described. The valve shaft 12a extends laterally outwardly from the right side of the valve housing 17 and at the point where it emerges from the valve housing 17 the shaft 12a is provided with a collar 161 securely fixed to or formed on the shaft 12a, the collar 161 being rotatable with the shaft 12a at all times. Surrounding the collar 161 is a first cam member 162 which includes an arm 163 and a ring member 164 having a plurality of cam sections 166 and dwell sections 167. The arm 163 at its lower end is bifurcated, as at 168, and engages a stationary pin 169 fixed to the right side of the valve housing 17 for the purpose of holding the cam member 162 against rotation. If desired, the cam sections 166 could be formed directly on or fixed to the casing 17 or some other convenient part, instead of being carried removably, as shown. Next outwardly of the cam member 162 is a companion cam member 172 of similar construction, embodying a ring section 173 having cam teeth 174 and an outwardly extending arm section 176 having its outer end apertured to receive the laterally turned end 177 of a link 178. The upper end of the latter is slotted, as at 181, and receives a pin 182 that is fixed to the laterally inner end of a bracket 183 welded or otherwise fixed to or formed on the power lift arm 72, as best shown in Figure 1. A rib 184 serves to reenforce the arm 183.

An arm 190 is disposed laterally outwardly of the cam arm 172 and is provided with a hub section 191 and an axially inwardly extending tongue 192. The tongue 192 extends from the laterally inwardly extended portion 191a (Figure 8) of the hub 191. The inner section of the hub 191 receives the cam section 173 of the member 172, forming a journal support therefor, and the tongue 192 being adapted to engage in an axially directed slot 193 formed in the collar 161 on the shaft 12a. Hence, when the parts are assembled, as shown in Figure 7, rocking movement of the arm 190 serves to rock the valve shaft 12a in one direction or the other. A spring 196 is carried at the outer end of the valve shaft 12a and at its inner end bears against the arm 190 and at its outer end bears against a washer 197 held on the shaft 12a by a cotter key 198 or any other suitable means. The outer end of the arm 190 receives the upper end of the link 148, the lower end of which is connected to the arm 147. Hence, the position of the arm 190 is controlled by the movement of the gauge wheel 100 relative to the plow beam 20 and the other gauge wheel 30.

The operation of the automatic valve controlling mechanism 150 and associated parts will now be described.

When the plow bottom 22 is operating at the proper depth and the ground surface is sufficiently firm to support the first gauge wheel 30 on the surface thereof alongside the controlling gauge wheel 100, the parts, assuming deep plowing position, are as indicated in Figure 1, the pin 106 being disposed in the intermediate portion of the slot 112, which causes the bell crank 135 to act through the link 142, the arms 145 and 147, and the link 148 to hold the arm 190 (Figure 8), and hence the valve shaft 12a to which the arm 190 is normally connected by the tongue and slot connection 192 and 193, in its intermediate position. This locks the hydraulic mechanism against movement and hence holds the rock shaft 16 and the arm 72 in adjusted position. Assuming now that the plow strikes a soft spot: The plow supporting gauge wheel 30 will sink in, somewhat as shown in full lines in Figure 6. However, the controlling gauge wheel 100, which sustains no load, remains on the surface of the ground, and as pointed out above, the sinking in of the gauge wheel 30 and the consequent lowering of the pivot point 120 serves to force the drum section 111 of the link 110 downwardly, thereby rocking the bell crank lever 135 from its dotted line position (Figure 6) to its full line position. This acts through the link 142, the arms 145, 147 and the link 148 to rock the arm 190. The latter, in turn, rocks the valve shaft 12a, the mechanism being arranged so that this movement, that is, the upward movement of the arm 190, operates the hydraulic mechanism in a direction to raise the plow beam 20, as by rocking the shaft 16 and arms 71 and 72 in a clockwise direction (Figure 2), forcing the link 70 rearwardly and pulling forwardly on the link 35, thus raising the plow 20 back to its original position, shown in dotted lines in Figure 6. This restores the pivot point 120 into its original position relative to the ground surface, and hence the drum section 111 of the link 110 moves back into its intermediate position and acts through the links 142 and 148 and associated parts to return the valve controlling arm 190 back to its intermediate or locked position. After the outfit has traveled beyond the soft spot, the gauge wheel 30 then rides up to the surface of the ground, and in doing so starts to raise the plow bottom 22 to a more shallow plowing position than that called for by the position of the adjusting lever 123. As soon, therefore, as the pivot point 120 starts to move higher than its determined position relative to the ground, the drum section 111 of the link 110 is pulled upwardly, until the pin 106 lies in the lower end of the slot 112. This swings the bell crank lever 135 in a counterclockwise direction (Figure 6) which exerts a forward thrust on the link 142, pulling downwardly on the link 148 and swinging the arm 190 in a downward direction, which now rocks the valve shaft 12a in the other direction, which causes the power lift mechanism to be actuated to lower the plow until again the point 120 on the plow is disposed at the required distance above the ground surface, and when the proper position is reached, the valve mechanism is again automatically locked to hold the plow at that depth. Obviously, swinging the depth adjusting lever 123 to different positions will adjust the plow for different operating depths.

As best shown in Figure 1, the bracket 183 is fixed to the power lift arm 72, and hence swings with the latter when the shaft 16 is rocked. However, during the depth adjusting range of movement of this part, the pin 182 on the bracket 183 merely moves back and forth in the slot 181 at the upper end of the link 178. However, when the power lift arm 72 moves into its shallow plowing position (Figure 3), the pin 182 is at the upper end of the slot 181 (Figure 7). Now, if it is desired to raise the plow, together with both of the gauge wheels 30 and 100, out of plowing position and into transport position, the hand lever 75 may be actuated, as by moving the same forwardly, which operates the valve shaft 12a directly through the arm 79 and the link 80 (Figure 1). The forward movement of the hand lever 75 causes the hydraulic mechanism to rock the lifting shaft 16, and the latter in turn acts through the lifting arm 72 to raise the plow into its transport position (dotted lines, Figure 3). At this time it is desirable to disengage the hydraulic valve means from the mechanism automatically operating the same when in plowing position; otherwise, when the plow is raised into its transport position, the gauge wheel 100 being no longer supported on the ground would tend to pull the pin 106 down into the lower end of the slot 112, and causing the power lift immediately to lower. In order to effect an automatic disconnection when the power lift mechanism of the tractor starts to move in its raising range, the cam members 162 and 172 have been provided, the former being held against movement by the pin 169 and the other being connected through the link 178 with the lifting arm 72 by the lost motion slot and pin connection 181, 182, mentioned above. When the arm 72 starts to raise the implement, the pin 182 engages the upper end of the slot 181 and raises the outer end of the arm 176. As best shown in Figure 8, this movement is in a direction to cause the cam teeth 166 and 174 to force the member 172 to the left. Since normally the member 172 is disposed against the controlling arm 190 (Figure 7), this movement of the member 172 axially of the shaft serves to disengage the tongue 192 (Figure 8) from the slot 193. As soon as the tongue 192 leaves the slot 193 the adjusting arm 190 is, of course, no longer connected to the valve shaft 12a, and hence the position of the pin 106 in the slot 112 has no effect upon the actuation of the valve mechanism. However, when the plow is returned to operating position, a small spring 210 (Figure 7) pulls downwardly on the arm 176 so as to return it into a position permitting the spring 196 to force the member 190 laterally inwardly, carrying the tongue 192 into the slot 193 as soon as the power lift arm 72 returns to its depth adjusting range, whereupon the control of the depth of plowing is returned to the gauge wheel 100 by the time the latter and the plow supporting gauge wheel 30 come into contact with the ground.

It will thus be apparent that, according to the principles of the present invention, I have provided an agricultural machine of the soil working type with means for automatically maintaining a constant depth of adjustment while, at the same time, permitting the soil working tool and associated parts to have relative free movement with respect to the tractor. Also, the various pivot connections between the links and associated parts are all sufficiently free to permit some lateral shifting movement of the implement. The automatic constant depth control is also so arranged as to be capable of being adjusted to different positions, preferably by a manually operated lever, the movement of which into a new position automatically causing the plow to shift into that position without any other act on the part of the operator. However, the power lift mechanism of the tractor is utilized and its movement divided, generally speaking, into two parts, the first movement serving to effect the required adjustments to secure a constant depth of plowing or to move the plow to different depths, as desired, and the second movement being utilized for raising both the plow and the gauge wheels into transport position and out of engagement with the ground.

It will therefore be apparent that, while I have shown and described the preferred structure in which the principles of the present invention have been incorporated, the present invention is not to be limited to the particular details shown and described above, but that, in fact, widely different means may be employed in the practice of the broader aspects of my invention.

What I claim, therefore, and desire to secure by Letters Patent is:

1. An agricultural machine comprising a tractor, a ground working tool movable relative thereto, ground engaging means separate from the tractor and movable along the ground surface with the tool for supporting said tool at various depths of operation, and means responsive to a change in the position of said tool relative to the ground and including a part on the tractor for shifting said ground engaging means relative to the tool for the purpose of keeping the latter in operation at a substantially constant depth.

2. An agricultural machine comprising a tractor, a ground working tool movable to different operating depths, a gauge wheel movably connected with said tool, means acting between the latter and said gauge wheel and including a part on the tractor for raising or lowering said tool, a second gauge wheel movably connected with said tool and adapted to ride along the ground surface, and mechanism controlled by said second gauge wheel for actuating said part so as to control said raising and lowering means.

3. An agricultural machine adapted to be connected to a tractor having tool raising and lowering means thereon, comprising a ground working tool, means connecting the latter with said tractor and said raising and lowering means, and means engageable with the ground surface for automatically operating said raising and lowering means so as to maintain said tool at the desired depth, said connecting means accommodating relatively free vertical movement of said tool relative to the tractor, said means for operating the raising and lowering means including relatively movable parts, certain of which normally move with said tool relative to the tractor and other parts connected with said raising and lowering means, said latter being controlled irrespective of the relative position between said tool and tractor.

4. An agricultural implement comprising a tractor, a ground working unit including a tool beam movably connected with the tractor and carrying ground engaging tool means, a gauge wheel movably connected with said tool beam, a crank axle connecting said gauge wheel with said tractor, said crank axle being pivoted to the tractor about an axis disposed approximately adjacent said tool beam, mechanism carried by the tractor for determining the position of said gauge wheel relative to said tool beam, including a part movable from one position to another adjacent said axis and a link extending from said part generally parallel with said tool beam to said gauge wheel, whereby movement of said tool beam and said gauge wheel relative to the tractor will have no material effect upon the position of the gauge wheel relative to said tool beam, means on the tractor for operating said mechanism, including a movable part disposed adjacent said axis, and a ground engaging element movably connected with said beam and with said last mentioned part, whereby said mechanism may be actuated by said last mentioned means so as to maintain said tool beam and said tool means in proper operating position relative to the ground independently of the position of said tool beam relative to the tractor.

5. An agricultural machine comprising means serving as an implement frame, a ground working tool movably connected therewith, ground engaging gauge means movably connected with said tool, longitudinally extending link means operatively connected with said gauging means for varying the position of said tool relative to the ground, mechanism on said frame means for shifting said longitudinally extending link means, a second gauging means disposed alongside said first gauging means and movable relative to said tool, and means operated by movement of said second gauging means relative to said tool for actuating said mechanism, said last named means including a part mounted for adjustment on said frame means, a ground engaging member and a connecting link between said part and said member extending generally parallel with respect to said link means.

6. An agricultural machine comprising means serving as an implement frame, a plow beam movably connected therewith at one end and having a furrow opener at the other end, a pair of ground engaging gauge wheels movable independently of one another and each being movably connected with said plow beam, mechanism acting through one of said gauge wheels for raising and lowering the furrow opener, and means controlled by the position of the other gauge wheel relative to the plow beam for actuating said mechanism.

7. An agricultural machine comprising means serving as an implement frame, a plow beam pivotally connected thereto at its forward end, mechanism for raising and lowering said plow beam, a part movably connected with said beam, manually adjustable means for controlling the position of said part, ground engaging means movably connected with said part and adapted to traverse the ground surface alongside said beam, and means controlled by the relative position of said ground engaging means with respect to said part for actuating said raising and lowering mechanism.

8. An agricultural machine comprising a tractor having a power lift, tool means connected with the tractor for movement relative thereto, means deriving power from the tractor power lift and operative through a first range of movement for adjusting the depth of operation of said tool means and operative through another range of movement for raising and lowering said tool means, means including a ground engaging part for automatically controlling said adjusting means throughout its adjusting range, and means for disabling said last mentioned means when said adjusting means operates and enters its other range of movement.

9. An agricultural machine comprising means serving as an implement frame, tool means movably connected with said frame means and adapted to be raised and lowered, gauge means for said tool means, mechanism on said frame means operative through one range of movement for shifting said gauge means relative to said tool means for gauging the depth of operation thereof, a second gauge means movably connected with said tool means, means responsive to relative movement of the second gauge means with respect to said tool means for actuating said mechanism, separate means for actuating said mechanism through another range of movement, and means actuated by movement of said mechanism through its other range of movement for raising both gauge means and said tool means out of ground engaging position.

10. An agricultural machine as defined in claim 9, further characterized by means for throwing said second gauge means out of operation when the means for operating said first gauge means move into a second range of movement.

11. An agricultural machine comprising a tractor, a ground working tool disposed generally longitudinally of the tractor and pivotally connected therewith for vertical swinging movement, a crank axle pivoted to the tractor for vertical swinging movement about a transverse axis disposed generally in a line between said tool and its connection with the tractor, a gauge wheel mounted on the outer end of said crank axle, shiftable connections between said gauge wheel and said tool, means on the tractor operatively connected with said connections and reacting therethrough against the gauge wheel for raising and lowering said tool, a second gauge wheel, a crank axle therefor pivotally connected with the tractor for movement with and relative to said first crank axle, connections between said second gauge wheel and said tool, said last mentioned connections shifting when the reaction of said tool against the first gauge wheel causes the same to sink into the ground, and means operated by movement of said last mentioned connections for operating said raising and lowering means.

12. An agricultural machine as defined in claim 11, further characterized by said last mentioned means being mounted on the tractor, and both said last mentioned means and said raising and lowering means being connected, respectively, with their associated connections at points adjacent the pivot axes of said crank axles, whereby both of said gauge wheels swing vertically with said tool relative to the tractor without causing any material change in the positions of said connections.

13. An agricultural machine comprising means serving as an implement frame, a ground working tool movably connected with said frame means for vertical movement relative thereto, means for raising and lowering said tool means, gauge means, a crank axle carrying said gauge means and connected with said frame means for movement relative thereto about a pivot axis, connections carried by said tool means and movably associated with said gauge means, and means operated by relative movement between said connections and said gauge means for operating said raising and lowering means, said last mentioned means being mounted on said frame means and operatively connected with said gauge means by relatively movable parts pivotally connected together about an axis coinciding with the pivot axis of said crank axle, whereby said gauge means is free to move with said ground engaging tool relative to said frame means without operating said raising and lowering means.

14. An agricultural machine comprising a tractor having a valve-actuated hydraulic power lift, the latter including a valve controlling part, a ground working tool movably connected with the tractor, means connecting said tool with said power lift whereby operation thereof through a first range controls the depth of penetration of the tool, gauging means releasably connected with said valve controlling part for actuating said power lift to automatically control the position of said tool, means actuated by movement of said power lift through another range of movement for raising said tool to inoperative position, and means actuated by movement of said power lift into its second range of movement for releasing said gauging means from its connection with said valve controlling part.

15. An agricultural implement comprising a tractor having a motor, hydraulic mechanism driven by the tractor motor and including a shiftable part, hydraulically operated means for shifting said part, and valve means controlling said hydraulic means and serving to control the shifting of said part from one position to the other and to hold the same in intermediate positions against movement in at least one direction, a ground engaging tool movably connected with the tractor, mechanism for raising and lowering said tool, means connecting said mechanism with said shiftable part, gauging means responsive to the position of said tool relative to the ground surface for controlling said valve means so as to cause said hydraulic mechanism to automatically operate said raising and lowering means and maintain said ground engaging tool at substantially constant operating depth, separate means for operating said valve means, and means controlled by the movement of said shiftable part beyond a given range for automatically disconnecting said gauging means from said valve means.

16. An agricultural machine as defined in claim 15, further characterized by said responsive means comprising a pair of relatively rotatable cam elements, means for holding one of said elements stationary, means connecting the other element with said shiftable part, and means whereby relative movement of said elements beyond a certain amount automatically disengages said gauging means from said valve means.

17. An agricultural implement comprising frame means, a ground working tool movably connected therewith, a pair of crank axles pivotally connected with said frame means, a gauge wheel on the outer end of each crank axle, mechanism reacting against one gauge wheel for shifting the position of said tool relative thereto, and means controlled by the other gauge wheel for actuating said mechanism.

18. An agricultural machine comprising a tractor, a ground working tool connected therewith, raising and lowering means deriving operating energy from the tractor and reacting against the ground separately from the tractor for raising and lowering said tool, and gauge means responsive to changes in the operating depth of said tool for operating said raising and lowering means.

19. An agricultural machine comprising a ground working tool, means for raising and lowering said tool in operating position and including means engageable with and reacting against the ground, the reaction of the tool tending to cause said means to sink into the ground when the tool tends to run too deep, and means also engageable with the ground adjacent said first ground engaging means and responsive to changes in the position of said first and second ground engaging means for controlling said raising and lowering means.

20. An agricultural machine comprising a tractor, tool means movably connected therewith, adjustable means including an operating unit on the tractor for gauging the operating depth of said tool means independent of variations in the position of the tractor relative to the tool means, and means responsive to changes in the operating depth of said tool means for adjusting said depth gauging means.

21. An agricultural machine adapted to be connected to a tractor having tool raising and lowering means thereon, comprising a ground working tool, draft means connecting said tool with the tractor for relative free movement with respect thereto, means on the tractor and connected with said tool for raising and lowering the latter substantially independent of variations in the position of the tool relative to the tractor, means responsive to changes in the operating depth of said tool, and means connecting said depth responsive means with said raising and lowering means and accommodating the relative free movement of the tool relative to the tractor for automatically operating said raising and lowering means so as to maintain said tool at the desired depth.

22. An agricultural machine comprising a tractor having a power connection, tool means connected with the tractor for movement relative thereto, means deriving power from the tractor power connection for adjusting the depth of operation of said tool means, means including a ground engaging part for automatically controlling said adjusting means, and means for disabling said automatic controlling means and raising said tool means into inoperative position.

23. An agricultural machine comprising a tractor having a valve-actuated hydraulic power connection, the latter including a valve controlling part, a ground working tool movably connected with the tractor, means connecting said tool with said power connection whereby operation thereof through a first range controls the depth of penetration of the tool, gauging means connected with said valve controlling part for actuating said power connection to automatically control the position of said tool, and means actuated by movement of said power lift through another range of movement for raising both said tool and said gauging means to inoperative position.

24. An agricultural implement adapted to be propelled by a tractor, comprising an earth working tool, means connecting the latter with the tractor for generally free vertical movement relative thereto, and means actuated by the tractor motor and responsive to the position of said tool relative to the ground for auomatically maintaining said tool at approximately constant working depth during operation, irrespective of relative movement between said tool and the tractor.

25. An agricultural machine comprising a tractor, an implement movably connected therewith and including tool means and ground engaging means determining the operating depth of said tool means, mechanism including means on the tractor for shifting the position of said tool means relative to said ground engaging means, and means responsive to movement of the tool means relative to the ground surface for controlling said mechanism.

26. In combination, a tractor, an agricultural implement having ground working tool means and connected with the tractor for generally free vertical movement relative thereto, a power unit deriving energy from the tractor and adapted to control the working depth of the tool means in the ground in any vertical position of the implement relative to the tractor, and control means for the power unit and sensitive to variations from a predetermined operating depth of the tool means for causing the power unit to function to maintain said tool means at said predetermined operating depth, irrespective of movement of the implement relative to the tractor.

27. In combinaion, a tractor, an agricultural implement having ground working tool means and connected with the tractor for generally free vertical movement relative thereto, means on the implement for raising and lowering the tool means to vary the operating depth thereof, a power unit deriving energy from the tractor and adapted to control said implement raising and lowering means, and control means for the power unit and sensitive to variations from a predetermined operating depth of the tool means for causing the power unit to function to maintain said tool means at said predetermined operating depth, irrespective of movement of the implement relative to the tractor.

28. An agricultural machine comprising propelling means, implement means connected therewith for swinging movement relative to the propelling means about an axis, and including movable ground working tool means, means on the implement for adjusting the operating depth of said tool means, means on the propelling means for operating said adjusting means, connecting means between said adjusting and operating means, said connections being disposed adjacent the axis of said swinging movement of said implement means, and means responsive to movement of said tool means relative to the ground, resulting from changes in the operating depth of said tool means, for actuating said operating means.

29. An agricultural machine comprising an operating unit, means for raising and lowering said operating unit relative to the ground surface, means responsive to changes in the position of said operating unit relative to the ground surface for controlling said raising and lowering means, means for raising said operating unit into a transport position, and means responsive to actuation of said last mentioned raising means for disabling said responsive means.

30. An agricultural machine comprising a tractor having a power connection, a ground working tool adapted to be propelled by said tractor, means for raising and lowering said tool, means responsive to the position of said tool relative to the ground for actuating said raising and lowering means and including a part on the tractor, a ground engaging part and connections between said parts, means for adjusting said connections so as to adjust said tool for differet depths of operation, and means operative to disconnect said connections and raise said tool independently of the position of said ground engaging part relative to said tool.

31. An agricultural machine comprising a tractor, a ground working tool connected therewith, means on the tractor for raising and lowering the tool, means responsive to the depth of operation of said tool for controlling said raising and lowering means, means for disabling said responsive means, and means responsive to the movement of said raising and lowering means when moving said tool into operating position for restoring the operativeness of said depth responsive means.

32. An agricultural machine comprising a tractor, a ground working tool, means on the tractor for raising and lowering said tool, ground engaging means movable relative to said tool in response to changes in the depth of operation thereof, connections between said ground engaging means and said raising and lowering means for automatically operating the latter so as to maintain a desired depth of operation, means adapted to disable said connections and to raise said tool into transport position, and means operative when said tool moves out of transport position and into an operating position for restoring the operativeness of said connections so as to control the depth of operation of said tool.

33. An agricultural implement comprising a tractor, ground working tool means connected with the tractor for generally free vertical movement relative thereto, operating means including ground engaging gauge means for adjusting the depth of operation of said tool means in any position of the latter relative to the tractor, ground engaging pilot means movable relative to said tool means and responsive to changes in the depth of operation of the latter, and means controlled by movement of said tool means relative to said pilot means and reacting against said gauge means for adjusting said operating means.

34. An agricultural machine comprising a tractor, a ground working tool means on the tractor for raising and lowering said tool and operative through two ranges, ground engaging means movable relative to said tool in response to changes in the depth of operation thereof, connections between said ground engaging means and said raising and lowering means for automatically operating the latter through one range and maintain a desired depth of operation, means to operate said raising and lowering means through the second range, means controlled by movement of the raising and lowering means in the raising direction through said second range to disable said connections, and means operative when said raising and lowering means moves through said second range in the lowering direction for restoring the operativeness of said connections so as to control the depth of operation of said tool.

35. An agricultural implement comprising a tractor, a plow beam movably connected therewith at one end and having a furrow opener at the other end, means including a power unit on the tractor and a part movably carried by the plow beam and adapted to engage the ground for controlling the depth of operation of said furrow opener, means responsive to the depth of operation of said furrow opener, and connections between said depth responsive means and said power unit whereby the operation of the latter is controlled by the depth of operation of said furrow opener.

36. An agricultural machine comprising a tractor having a power connection, tool means connected with the tractor, means reacting against the ground for gauging the depth of operation of said tool means, means reacting against the tractor for lifting said tool means, means deriving power from the tractor power connection for actuating said gauging means and said lifting means in succession, and means responsive to changes in the operating depth of said tool means for controlling said depth gauging means.

37. An agricultural implement adapted to be connected to a tractor having a power connection, said implement comprising ground working tool means movable relative to the tractor, ground engaging gauge means movable with said tool means relative to the tractor, means adapted to be carried by the tractor for raising said tool means, a part to be connected with said power connection on the tractor, connections between said part, gauge means and raising means whereby movement of said part by said power connection through one range controls the operating depth of said tool means and movement of said part through another range actuates said raising means, and means responsive to changes in the operating position of said tool means for controlling said part through said one range.

38. An agricultural implement adapted to be connected to a tractor having a power connection, said implement comprising ground working tool means movable relative to the tractor, means for adjusting the depth of operation of said tool means, separate means for lifting said tool means into raised position, a part to be connected with said power connection and operative through one range to actuate said adjusting means and operative through another range to actuate said lifting means, depth responsive means connected to actuate said power connection and move said part to different positions in said first range, means for actuating said power connection for shifting said part through its other range of movement to lift said tool means, and means responsive to movement of said part through said second range of movement for disconnecting said depth responsive means from said power connection.

39. An agricultural implement comprising tool means, mechanism for raising and lowering said tool means into and out of an inoperative transport, means responsive to momentary changes in the operating depth of said tool means, means including separable parts connecting said responsive means so as to adjust the operating depth of said tool means, and means for separating said separable parts when said mechanism raises said tool means into its inoperative position.

THEOPHILUS BROWN.